United States Patent Office 3,753,862
Patented Aug. 21, 1973

3,753,862
METHOD OF MAKING FUNGICIDAL SUBSTANCE AGAINST CANDIDA AND CANDIDA-LIKE, YEAST-LIKE FUNGI
Masami Oimomi, 1131 Mega, Shikama-ku,
Himeji-shi, Hyogo-ken, Japan
Filed Mar. 15, 1971, Ser. No. 124,204
Claims priority, application Japan, Apr. 1, 1970,
45/27,661
Int. Cl. C12b 1/00
U.S. Cl. 195—96                                4 Claims

ABSTRACT OF THE DISCLOSURE

The method of making a fungicidal substance by culturing a strain of enterobactic FERM No. 444 and extracting the substance from the culture.

---

Figure 1:
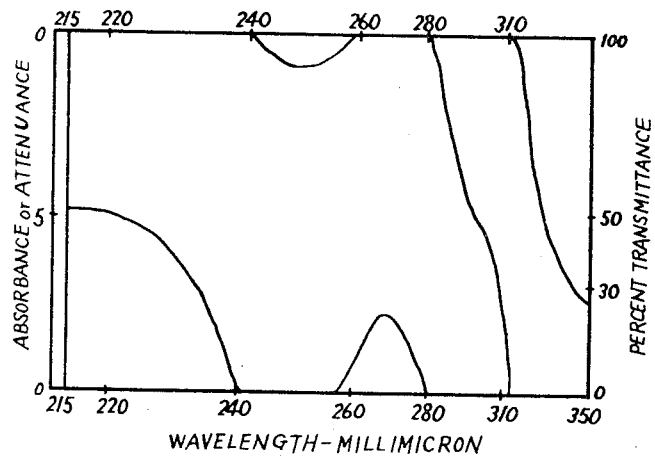

This invention relates to a method of making a fungicidal substance effective against candida, candida-like and yeast-like fungi from a culture of enterobacter strain. This strain was deposited on Dec. 2, 1969, in the Fermentation Research Institute of Agency of Industrial Science and Technology of the Japanese Government and has since been maintained therein with a reference designation of FERM-P No. 444.

Several kinds of antibiotics have been proposed heretofore, for the medical treatment of candida, which is a principal pathogenic microorganism in trichophytic pompholyx, and of gynecological diseases of the external genitals, chronic stomatitis, laryngitis, pharyngitis and bronchitis, otorrhoea and the like. However, such antibiotics have evidenced various difficulties and their effects in treatment have therefore been unsatisfactory.

As a result of investigation of anti-candida substances on intestinal bacteria of the human body, this inventor has extracted a fungicidal factor through ether from filtrate of 2 percent aqueous peptone culture of a bacteria strain detected from feces of a diarrheatic patient. This strain was identified with enterobacter as a result of the following bacteriological qualities.

The strain is a Gram-negative short bacillus having spherical portions at the both ends of a dumb-bell and exhibiting proper motion. It is well stained with conventional stain solutions and both ends are stained especially deeply so that it is sometimes confused apparently with a micrococcus. It is found that this confusion is due to shortness of its body when it is observed through a microscope in a dark field. It is not anti-acidic but is generally aerobic, and grows well on an agar culture medium in general and forms a wet, soft and round projecting colony. It grows along a stab on a glucose agar culture medium and produces a gas. In the case of bouillon, peptone and water culture media, it grows with uniform turbidity and, in the case of potato culture medium, it forms a cream-like bacterial moss. The aqueous peptone culture medium comes to have a pH of 7.8 to 8.2 and to exhibit alkalinity after about four days of culture.

The state of growth of this strain in 0.08 mol phosphoric acid buffered aqueous peptone solution is as follows at various pH values.

| | | | |
|---|---|---|---|
| 5.5 | + | 6.6 | + |
| 5.8 | + | 7.0 | + |
| 6.0 | + | 7.2 | + |
| 6.3 | + | 7.6 | + |

Tested qualities of this strain for identification are as follows:

TSI culture medium: —AG, $H_2A$ (—)
Simons' culture medium: $H_2S$ (—), Indol, (—), IPA (—)
Coagulase: + milk coagulated after three days.
Methyl red reaction: —
Voges-Proskauer reaction: +
Simon's sodium citrate culture medium: +
Christensen's sodium citrate culture medium: +
Sodium acetate culture medium: +
Lysine decarboxylation: —
Citochol oxydase reaction: —
Of examination: F
Catalase: +
Reduction of nitrate: +
Decomposition of carbonhydrate (Bazikov/s culture medium):
    Arabinose: +
    Glucose: +
    Galactose: +
    Maltose: +
    Mannose: +
    Rhamnose: —
    Saccharose: +
    Trehalose: +
    Xylose: +
    Adonitol: —
    Sulcitol: +
    Mannitol: +
    Sorbitol: +
    Salicin: +

According to the above result, this strain was identified with "enterobacter" strain and deposited as described in the preface. Therefore, this strain will be referred hereinafter as "strain No. 444."

Other features and method of this invention will be described in detail hereinunder with reference to the accompanying drawings.

Figure 2:
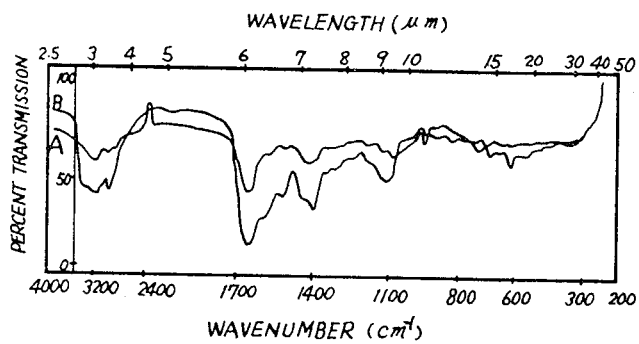

In the drawings:
FIG. 1 is a diagram representing an ultra-violet absorption spectrum of a substance extracted in accordance with this invention; and
FIG. 2 is a diagram representing an infra-red radiation absorption spectrum of the substance of FIG. 1.

The candicidal properties of the strain No. 444 were proven as described hereinafter, though there had been no method standardized for proving such property.

Laboratory candida strain was cultured in Mizuno-Takata's culture medium (hereinafter referred to as MT-medium) to form a moss within a week, and a quarter loop of the moss is dispersed in one milliliter of sterilized distilled water. This dispersion will be referred hereinafter as "testing solution."

Strain No. 444 was cultured in aqueous peptone solution consisting of 2 grams of peptone and 100 milliliters of distilled water and including no table salt at 37° C. for four days. It grew vigorously and formed a bacterial film contrary to the case where table salt is included. This culture was made using four one hundred milliliter triangular flasks.

One loop of the testing solution was added in one milliliter of culture from each flask and stirred and one loop of this dispersion was soon applied onto MT-medium and cultured for a preselected time. Then, the number of colonies formed on the medium was counted to obtain the zero hour value shown in Table 1. The same one milliliter dispersion was maintained at 37° C. for nine hours and then similarly cultured on MT-medium, thus obtaining the nine hour value in the same table.

As clearly shown in Table 1 below, the candicidal property of strain No. 444 has been established after nine hours, since it had been known that the strain No. 444 forms no significant colony on the MT-medium.

TABLE 1

| Flask number | 1 | 2 | 3 | 4 |
|---|---|---|---|---|
| 0 hour | 200 | 50 | 50 | 80 |
| 9 hours | 21 | 0 | 2 | 1 |

The fungicidal substance was extracted as described below from the abovementioned cultured solution of the strain No. 444 maintained at 37° C. for four days.

One hundred milliliters of the cultured solution was filtered and the filtrate was added with the same amount of ether. After sufficient agitation, the mixture was separated and the ether portion was evaporated and dried, thereby obtaining about 0.5 milliliters of colorless, rather viscous liquid having slight fatty odour. This liquid substance can be easily dissolved in water and exhibits optical rotation power of −127.5 degrees.

Further, this extracted substance exhibits an ultraviolet ray absorption spectrum pattern as shown in FIG. 1 and an infra-red ray absorption spectrum pattern as shown in FIG. 2. In FIG. 2, Curve A shows a waveform measured with a tablet method wherein the extracted liquid was distilled at reduced pressure, the residue was extracted with benzene and 600 milligrams of potassium bromide was added to the extract after removing benzene therefrom; and Curve B shows a waveform measured similarly after adding thereto the portion which did not dissolve in benzene.

Candicidal quality of the extracted substance was proved as follows. All of the above 0.5 milliliter liquid was dissolved in distilled water to form one milliliter of "original extracted solution." In the same manner as in the case of Table 1, the original extracted solution and its ×10, ×100, ×1000 aqueous dilutions were tested at various times of lapse and the numbers of colonies were counted. The result of the test is shown in Table 2.

TABLE 2

| Dilutions | ×1 | ×10 | ×100 | ×1000 |
|---|---|---|---|---|
| 0 min | 1 200 | 1 150 | 1 180 | 1 150 |
| 5 min | 5 | 5 | 10 | 3 |
| 10 | 7 | 7 | 7 | 4 |
| 15 min | 0 | 5 | 2 | 2 |
| 30 min | 0 | 5 | 2 | 2 |
| 1 hour | 0 | 4 | 12 | 3 |
| 2 hours | 0 | 0 | 2 | 6 |
| 3 hours | 0 | 0 | 4 | 7 |
| 4 hours | 0 | 0 | 2 | 7 |
| 5 hours | 0 | 0 | 7 | 2 |
| 6 hours | 0 | 0 | 1 | 2 |
| 7 hours | 0 | 0 | 6 | 4 |
| 8 hours | 0 | 0 | 6 | 7 |
| 9 hours | 0 | 0 | 7 | 4 |

1 Approximate.

Throughout the nine hours period, there was no change of the number of colonies in the reference solution.

As clearly shown in the table, the time at which candicidal effect became evident is about 15 minutes in the case of the "extracted solution" as contrasted with about 9 hours in the case of the "cultured solution," although it is true that the "extracted solution" has been concentrated about 100 times the "cultured solution." Thus it has been found that the fungicidal substance had been extracted in accordance with this invention.

Further, this substance exhibits its candicidal effect also against the first generations of two strains of Candida albicans, one strain of Candida stellatoidea and three strains of candida-like, yeast-like fungi, which were separated from a focus and cultured in MT-medium. In addition, it is also effective to two strains of yellow staphylococcus and two strains of streptococcus from an oral cavity, but is ineffective to two strains of colibacillus from a diarrheatic patient.

Moreover, the fungicidal quality of the extracted substance is not deteriorated by heating at 100° C. for 5 minutes and at 60° for 30 minutes. The extracted solution exhibits pH of about 7.8. Even though the pH was modified to 5.0 by adding acetic acid and was maintained at 15° C. for about 10 hours, its fungicidal quality was not reduced.

While mice were injected intravenously 0.1 milliliter of the extracted solution, 0.2 milliliter in the abdominal cavity and inoculated 0.1 milliliter through nose, respectively, all of the mice were living and virulence were not detected.

This strain has sensibility to streptomycin, the tetracycline and Kanamycin but has no sensitivity to penicillin and chloramphenicol. Sometimes, producibility of fungicidal factor of the strain seems to be reduced by successive generation culture, but can be restored by culturing in 2 percent peptone solution and then storing in an ice box at 2° C. for 2 months.

What is claimed is:

1. The method of making a funcidal substance, comprising the steps of:
   culturing a strain of Enterobacter Ferm. No. 444,
   filtering the resulting cultured solution of said strain,
   adding ether to the resulting filtrate of said solution to extract in said ether and from said filtrate a fungicidal substance, and
   evaporating said ether therefrom.

2. The process of claim 1 wherein the culturing of said strain of Enterobacter is carried out at 37° C. for a period of about four days.

3. The process of claim 2 wherein said strain is cultured in an aqueous peptone-containing solution.

4. A fungicidal substance having an infra-red absorption spectrum with maxima at 3200 cm.$^{-1}$, 1700 cm.$^{-1}$, 1400 cm.$^{-1}$, and 1100 cm.$^{-1}$ produced by the process of claim 1.

References Cited

J. Debat, Chem. Abs., vol. 72, #131098X, 1970.

A. LOUIS MONACELL, Primary Examiner

G. M. NATH, Assistant Examiner

U.S. Cl. X.R.

424—115

UNITED STATES PATENT OFFICE
CERTIFICATE OF CORRECTION

Patent No. 3,753,862             Dated August 21, 1973

Inventor(s) Masami Oimomi

It is certified that error appears in the above-identified patent and that said Letters Patent are hereby corrected as shown below:

Claim 1, line 1 (col. 4, line 33), "funcidal"

should be -- fungicidal --.

Signed and sealed this 30th day of July 1974.

(SEAL)
Attest:

McCOY M. GIBSON, JR.　　　　　　　　　C. MARSHALL DANN
Attesting Officer　　　　　　　　　　　Commissioner of Patents